United States Patent [19]

Michalski

[11] Patent Number: 5,066,471
[45] Date of Patent: Nov. 19, 1991

[54] LOWERING POST-PRECIPITATION IN MERCHANT ACID

[75] Inventor: Dennis H. Michalski, Lakeland, Fla.

[73] Assignee: IMC Fertilizer, Inc., Northbrook, Ill.

[21] Appl. No.: 617,634

[22] Filed: Nov. 26, 1990

[51] Int. Cl.$^5$ .................... C01B 25/222; C01B 25/234
[52] U.S. Cl. .................... 423/319; 423/321 R
[58] Field of Search .................... 423/321 R, 319

[56] References Cited

U.S. PATENT DOCUMENTS

| | | |
|---|---|---|
| 2,936,888 | 5/1960 | Williams . |
| 3,328,123 | 6/1967 | Parks et al. .................... 423/321 R |
| 3,338,675 | 8/1967 | Gilbert, Jr. . |
| 3,371,991 | 3/1968 | Sergeys et al. .................... 423/321 |
| 3,455,651 | 7/1969 | Satterwhite et al. .................... 171/33 |
| 3,907,680 | 9/1975 | Hill, Sr. . |
| 4,048,289 | 9/1977 | Pierres . |
| 4,110,422 | 8/1978 | Hill . |
| 4,164,550 | 8/1979 | Hill . |
| 4,250,154 | 2/1981 | Hill .................... 423/321 R |
| 4,305,915 | 12/1981 | Hill . |
| 4,487,750 | 12/1984 | Astley et al. .................... 423/321 R |
| 4,632,814 | 12/1986 | Dougherty et al. .................... 423/321 R |
| 4,640,828 | 2/1987 | Baumann . |

FOREIGN PATENT DOCUMENTS 617322  3/1961  Canada .................... 423/321 R

Primary Examiner—Wayne A. Langel
Attorney, Agent, or Firm—Banner, Birch, McKie & Beckett

[57] ABSTRACT

The present process stabilizes merchant acid from bottoms solutions against post-precipitation by heating the acid to a temperature of at least about 180° F. for about 12 to about 48 hours. The stabilized acid product exhibits less than about 1 wt % solids precipitation after even 14 days of standing at about 70° F.

4 Claims, 3 Drawing Sheets

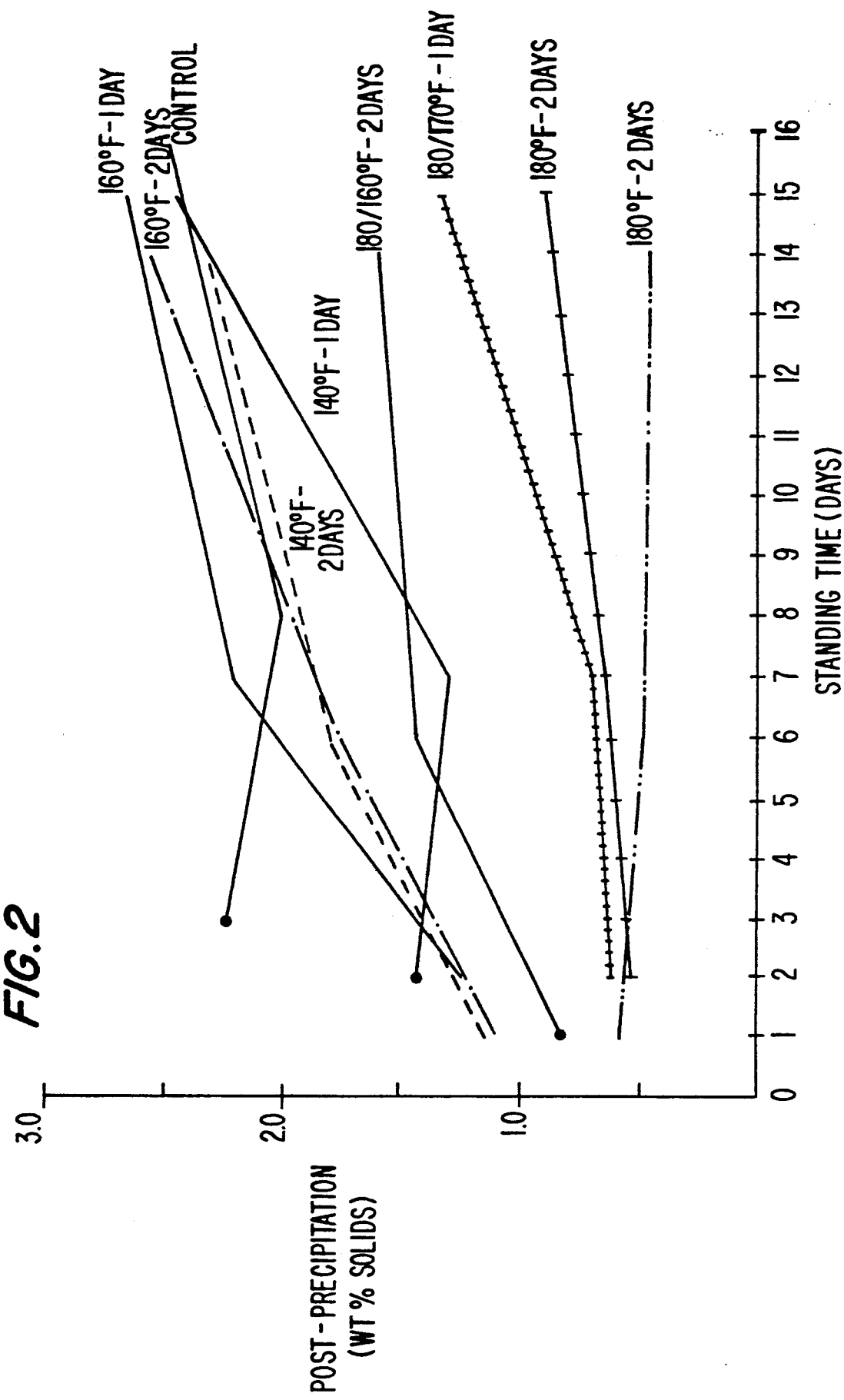

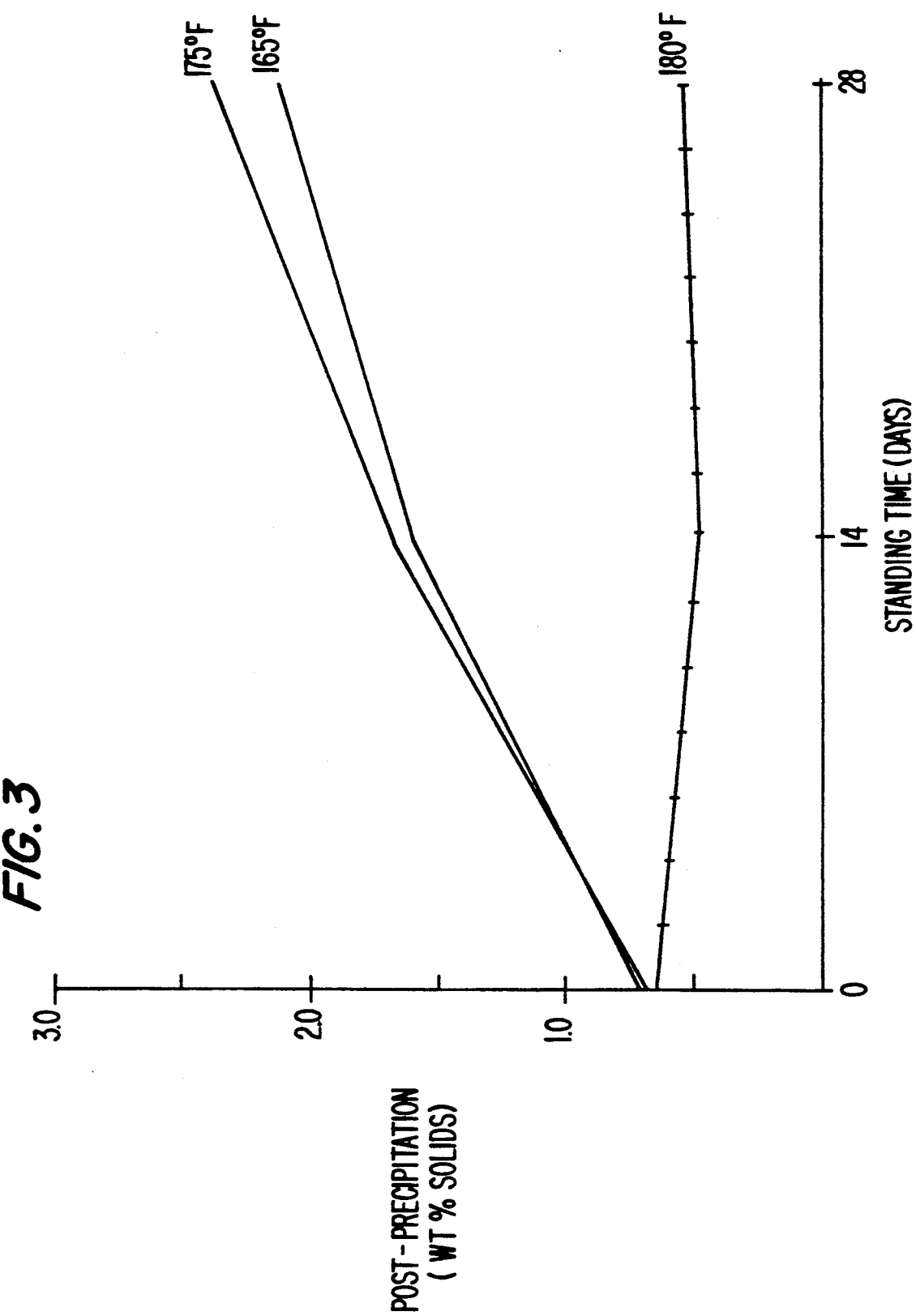

LOWERING POST-PRECIPITATION IN MERCHANT ACID

FIELD OF THE INVENTION

The invention relates to a process for stabilizing merchant acid against post-precipitation by heating merchant acid for about 12 to about 48 hours at a temperature of at least about 180° F.

DESCRIPTION OF RELATED TECHNOLOGY

Concentrated phosphoric acid is conventionally made from phosphate-containing ore in the well known "wet process" which includes dissolution of the ore in phosphoric acid, contact with sulfuric acid to precipitate calcium compounds, and vacuum evaporation at about 155°-160° F. to concentrate the phosphoric acid. The final concentration is calculated to be about 45-60 wt % $P_2O_5$, preferably about 54 wt %.

Freshly prepared merchant acid contains a number of solids and solids precursors. The solids will precipitate by quiescent settling, filtration, or centrifugation. The solids precursors, however, are finely divided crystals that remain suspended in solution regardless of the physical separation processes attempted. Ultimately, the crystals grow sufficiently large that they precipitate in a phenomenon known as "post-precipitation". The precipitated solids are primarily iron, aluminum, and magnesium. Because the growth of such solids has caused fouling problems for purchasers of merchant acid, centrifuged merchant acid is typically used inside the manufacturing facility for a variety of uses where solids content is tolerable.

A variety of treatment sequences have been tried in an attempt to remove the insoluble solids and their precursors from the solution. In Williams U.S. Pat. No. 2,936,888 (which is herein incorporated by reference), the bulk 54% $P_2O_5$ acid stream is rapidly cooled from over 150° F. by at least 20° F. (preferably at least 30° F.) and centrifuged to remove most of the insoluble materials. The cooling period is less than 24 hours and most preferably less than 4 hours with a holding period of 12-36 hours at less than 120° F. The cooling step is postulated to break any supersaturation of solids precursors in the solution and thereby cause the precursors to form solids without post-precipitation. For the use of precipitation agents to accelerate the precipitation of the suspended solids in a cooled phosphoric acid, see U.S. Pat. Nos. 4,256,570; 4,341,638; and 4,640,828 which are herein incorporated by reference.

Cooling the volumes of concentrated phosphoric acid associated with commercial manufacture, however, requires a significant supply of cooling water and associated cooling costs. The cooling process also requires equipment made of materials that will not corrode by contact with the acid over an economic lifetime. It would be desireable if such costs could be avoided without sacrificing the stability of the resulting merchant acid product.

Another method for stabilizing merchant acid against post-precipitation is by heating the merchant acid. Various heat treatments for merchant acid have been disclosed in the art. Sergeys et al. U.S. Pat. No. 3,371,991 stabilizes merchant acid by heating the acid for at least 2 minutes, preferably 2-60 minutes, at temperatures above the boiling point of the acid, e.g. 100°-250° C. (212°-482° F.) under superatmospheric pressures (28-70 psig).

Unfortunately, superatmospheric conditions such as those in Sergeys et al. require a pressure vessel with significant safety controls against accidental escape of boiling acid. There is no disclosure in Sergeys et al. of appropriate conditions and duration under which one would operate a heat treatment process to obtain equivalent stabilization if superatmospheric pressures were not used.

Satterwhite et al. U.S. Pat. No. 3,455,651 involves a process for growing crystals from the solids precursors by heating merchant acid in a first step at 150°-185° F. for 8-16 hours, cooling the acid, and then aging the cooled material in a second step at 80°-120° F. for 8-16 hours. The grown solids are then separated by one or more centrifuges. Because the liquid volumes to be centrifuged can be quite large, it would be desireable if the solids were not formed in the first place thereby eliminating the need to separate out the precipitated solids.

Hill U.S. Pat. No. 4,250,154 redissolves precipitated solids by heating merchant acid from the Hill clarification process at 55°-85° C. (131°-185° F.) for about 10 minutes. Heating times of more than 10 minutes are said to be "of no purpose". The feed acid is a clarified acid that has once passed through the clarification process and formed solids upon cooling. Redissolving such solids, however, is not economical for the substantial quantities of merchant acid formed in commercial processes. Hill does not discuss use of the bottoms acid.

Astley et al. U.S. Pat. No. 4,487,750 involves a sequential process for producing stable acid of at least 58 wt % $P_2O_5$. The process involves concentrating the entire acid stream to about 45-55 wt % $P_2O_5$ and holding that acid at 140°-190° F. for 8-16 hours in a crystallizer. Thereafter, the solids are separated from the aged stream and the clarified acid is vacuum concentrated to 58-63 wt %. The product is described as having less than 2.0 wt % solids after 28 days of standing. Various examples at 185° F. are presented to show holding the 54% acid for 8 hours at 185° F. and concentrating the treated acid. Astley et al., however, treats the entire acid stream. Such volumes require large energy input to heat the entire acid stream up to the holding temperature and a large crystallizer tank to contain the volume.

It would be desireable to have a process for substantially reducing or eliminating post-precipitation in the concentrated phosphoric acid recovered from the bottoms stream so that the resulting product would less than about 1 wt % solids precipitation even after about 14 days of standing at about room temperatures. Preferably, such a treating process would operate at atmospheric pressures, would not require solids separation after the treatment, and would not require the reheating of large volumes of liquids.

SUMMARY OF THE INVENTION

It is an object of the invention to provide a process for producing merchant acid that is stable against post-precipitation.

It is an object of the invention to provide a treatment process for merchant acid that does not use a solids separation step after the heat treatment.

It is an object of the invention to provide a treatment process that does not use flocculants or precipitation-enhancing agents to reduce post-precipitation.

It is also an object of the invention to provide a heat stabilization process for merchant acid that can be operated at atmospheric pressures thereby avoiding the need for pressure vessels.

In accordance with these and other objects that will become apparent from the description herein, the invention comprises:

separating an acid stream containing about 45 to about 60 wt % $P_2O_5$ into a solids-containing bottoms stream and a clarified acid stream;

separating said bottom stream into a solids-enriched fraction and a merchant acid stream; and heating said merchant acid stream for about 12 to about 48 hours at a temperature of at least 180° F. to produce an aged merchant product that exhibits, without further solids separation, an amount of solids formed due to post-precipitation that is less than 1 wt % after 14 days of standing at a temperature of about 70° F.

In a further embodiment, the present process comprises a multistep process for making stabilized merchant acid which comprises the steps:

a. dissolving a phosphate-containing ore in phosphoric acid, b. contacting the dissolved ore with sulfuric acid to precipitate calcium compounds and produce a first solution comprising a phosphoric acid content of less than 40 wt % $P_2O_5$ by weight, c. concentrating said first solution under a vacuum at about 155°–160° F. to produce a second solution comprising about 40 wt % $P_2O_5$;

d. removing solids from said second solution, e. concentrating said second solution under vacuum at a temperature of about 175°–185° F. to produce an unclarified acid solution containing about 45–60 wt % $P_2O_5$, f. separating said unclarified acid solution into a clarified acid and a bottoms product, g. separating solids from said bottoms product to produce a merchant acid, h. heating said merchant acid at atmospheric pressures to a temperature between 180°–200° F. and maintaining said temperature for about 12 to about 48 hours to produce an aged merchant acid that exhibits, without further solids separation, a level of solids formed due to post-precipitation that is less than 1 wt % after standing for 14 days at a temperature of about 70° F.

Treating merchant acid according to the present process inhibits the formation of insoluble crystals without expensive processing equipment. Moreover, the presence of dissolved elements in a soluble form increase the economic value and uses for previously less valuable merchant acid. The enhanced stability provides an acceptably low level of solids formation during transport, storage, and extended usage periods.

BRIEF DESCRIPTION OF THE DRAWINGS

FIG. 2 graphically illustrates the stability of the unclarified merchant acid treated according to example 2.

FIG. 3 depicts a process for converting phosphate-containing ore into a stabilized merchant acid product.

DETAILED DESCRIPTION OF THE INVENTION

Figure 1:
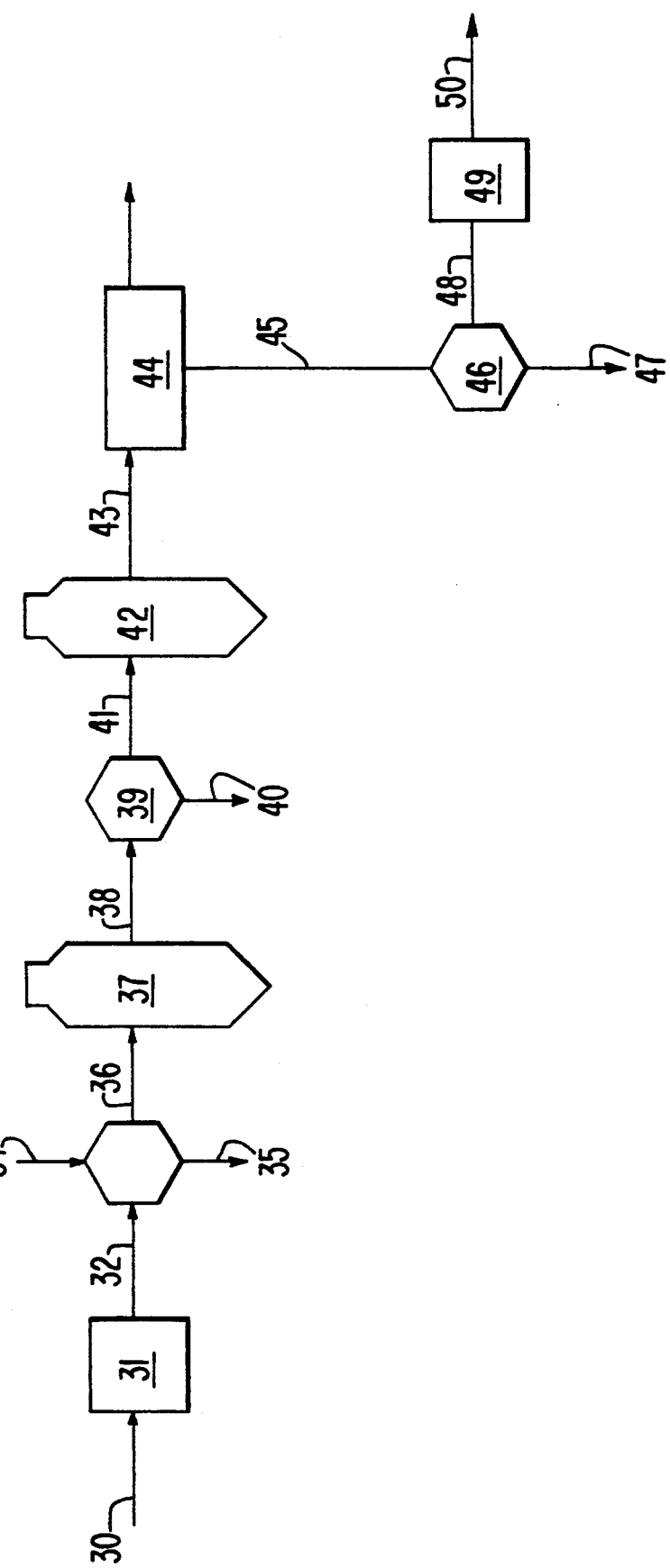
FIG. 1 depicts the test results from example 1 using a clarified merchant acid.

It has been found that the formation of insoluble materials in merchant acid involves the formation of crystals in the acid at acid temperatures of less than about 180° F. If the acid is allowed to age for a period of at least about 12 to about 48 hours at a temperature of at least about 180° F., crystal growth which results in post-precipitation is substantially reduced or eliminated. Preferably, the heating occurs at atmospheric pressures and a temperature of about 180° to about 200° F. for about 12 to about 48 hours. If the acid contains high levels of iron and/or aluminum, the acid will benefit most from an aging time of more than about 20 hours and preferably about 24–48 hours.

The present process is particularly useful for treating merchant acid produced from centrifuging a freshly prepared bottoms acid stream. Such a treated merchant acid does not require further treatments to avoid unacceptable levels of post-precipitation. Accordingly, the treatments can be targeted against only that volume, the merchant acid, which directly benefits from the treatment. Reducing the quantity of material actually treated results in substantial economic savings due to avoided heating costs. In addition, filtration means and associated tanks can be smaller and less costly.

According to the process of the invention, phosphoric ore is dissolved in phosphoric acid, subjected to preliminary solids separation, and concentrated to 45–57 wt % acid. The solids-rich portion of the concentrated acid, known as "unclarified 54% $P_2O_5$", is removed from the final evaporator at about 175°–185° F. and passed to a quiescent separation zone, e.g. a clarifying tank. The acid is held for a period of time sufficient to allow the solids to separate and gather at the tank bottom. Appropriate collection means removes the solids along with some quantity of acid as a solids-containing bottoms stream. The bottoms stream is passed to filtration means (such as a centrifuge) where the settled solids are removed. The clarified stream is the merchant acid. This merchant acid is passed to a heated holding zone and aged at a temperature above about 180° F. for about 12 to about 48 hours.

Agitation may be used in the heated holding zone if desired. Preferably, the acid is held at temperature without agitation, i.e. in a quiescent state. A suitable settling zone might be a separate insulated tank or a heat exchanger that might have been used previously for cooling the acid according to the prior art methods.

An aging temperature of about 180° F. has been found to be critical for stabilizing merchant acid solutions. The combination of this temperature and an aging period of about 12 to about 48 hours inhibits crystal formation of solids precursor compounds to a level sufficient that they not precipitate. Aging temperatures of less than about 180° F. are insufficient to perform the changes required of the precursor compounds to transform them into stable, dissolved compounds.

The compounds resulting from the aging step are quite stable in the acid and exhibit a level of post-precipitation that is less than about 1 wt % after 14 days of standing at room temperature (about 70° F.). Such stability translates directly into lower maintenance costs for acid handling equipment and higher levels of customer satisfaction with product stability from merchant acid.

Solids precursors of iron and aluminum phosphates are particularly addressed by the present process. Their stable dissolution in the acid results in a merchant acid product having beneficial levels of iron without an increase in the processing costs. The higher levels of soluble iron in the merchant acid are beneficial for fertilizers around plants that have need for soluble iron. Treated merchant acid according to the invention is, therefore, more useful than other merchant acids in certain fertilizer formulations.

FIG. 1 illustrates a detailed process for making stabilized phosphoric acid according to the invention. Phosphoric ore 30 is dissolved in dissolution unit 31. Effluent 32 containing dissolved acid and undissolved ore is then contacted with sulfuric acid 34 to precipitate calcium-containing solids 35 to produce a first solution 36 containing less than about 40 wt % phosphoric acid. First solution 36 is then concentrated in first vacuum evaporator 37 at 155°-160° F. to produce second acid solution 38 containing about 40 wt % acid. Second acid solution 38 is then clarified in separator 39 to remove additional calcium-containing solids 40 and produce a third acid solution 41.

Third solution 41 is concentrated in second vacuum evaporator 42 to about 45-57 wt % acid content. The product from evaporator 42 is known as unclarified 54% $P_2O_5$ acid 43 which is clarified in acid clarifier 44. Clarifier bottom stream 45 contains precipitated solids and some quantity of recoverable acid.

The acid from clarifier bottom stream 45 is recovered by centrifuging clarifier bottom stream 45 in centrifuge 46 to form solids stream 47 and bottoms product merchant acid 48. Merchant acid 48 is then heated to a temperature of at least about 180° F. and held at that temperature for about 12 to about 48 hours to age the acid and affect the crystal growth of suspended solids. The resulting aged acid product 50 exhibits, without further solids separation steps, a level of post-precipitation that is less than about 1 wt % after even 14 days of standing at room temperature, e.g. about 70° F.

The present process is conveniently described with reference to the following examples.

EXAMPLE 1

About 10 gallons of merchant acid was divided into five test groups and a control. Groups 1-3 and the control sample each composed two 1 gallon containers (container "a" and container "b") for a total of 8 gallons. Groups 4 and 5 were each composed of a single gallon each. The initial acid temperature for each Group was 155° F. The control samples were allowed to cool naturally to ambient temperature of about 70° F. Containers "a" from Groups 1-3 were heated and maintained at the aging temperature for one day. Containers "b" from Groups 1-3 were heated and maintained at the aging temperature for 2 days. After the aging period, each container was allowed to cool naturally to ambient temperature.

Groups 1-3 were placed into ovens set at 140° F., 160° F., and 180° F. (each having a temperature variance of no more than ±5° F.). The containers of Groups 4 and 5 were placed in a water bath whose temperature started out at 180° F. but was allowed to fall at the rate of about 0.5° F./hour to 170° F. The Group 4 container was removed when the water temperature was 170° F. and the Group 5 container remained in the water bath while it was allowed to continue cooling at the same rate to 160° F. All containers were stirred by overhead stirrers continuously for 16 hours/day and allowed to rest for 8 continuous hours.

At the end of the aging period, all containers were allowed to cool to room temperature (about 70° F.) naturally. The amount of post-precipitation exhibited by each Group was measured by shaking the respective container to suspend all solids. A 25 ml sample was taken for analysis which was a volume sufficiently small that the integrity of the remaining sample volume would not have been affected. Solids measurements were performed by filtration to determine the quantity of retained particles that were at least $5\mu$ in size. The test results are reported in Table 1 below and illustrated in FIG. 2.

The standing time for each sample is determined by the time between the end of the aging period and the extraction of a sample for analysis.

TABLE 1

| Aging T (°F.) | Aging Time (days) | Standing Time (days) | Total Retained Solids (wt %) |
|---|---|---|---|
| 70 | 0 | 3 | 2.24 |
| 70 | 0 | 8 | 1.97 |
| 70 | 0 | 16 | 2.48 |
| 140 | 1 | 2 | 1.43 |
| 140 | 1 | 7 | 1.29 |
| 140 | 1 | 15 | 2.43 |
| 140 | 2 | 1 | 1.25 |
| 140 | 2 | 6 | 1.78 |
| 140 | 2 | 14 | 2.31 |
| 160 | 1 | 2 | 1.25 |
| 160 | 1 | 7 | 2.20 |
| 160 | 1 | 15 | 2.63 |
| 160 | 2 | 1 | 1.11 |
| 160 | 2 | 6 | 1.74 |
| 160 | 2 | 14 | 2.54 |
| 180 | 1 | 2 | 0.53 |
| 180 | 1 | 7 | 0.64 |
| 180 | 1 | 15 | 0.88 |
| 180 | 2 | 1 | 0.58 |
| 180 | 2 | 6 | 0.48 |
| 180 | 2 | 14 | 0.54 |
| 180/170 | 1 | 2 | 0.62 |
| 180/170 | 1 | 7 | 0.70 |
| 180/170 | 1 | 15 | 1.32 |
| 180/160 | 2 | 1 | 0.83 |
| 180/160 | 2 | 6 | 1.42 |
| 180/160 | 2 | 14 | 1.57 |

In example 1, the total retained solids values for the control samples, 140° F. for 1 day, and 180° F. for 2 days show a decrease in the amount of total solids after several days. Experimental error may explain some of the decrease in solids, however, some of the drop may be explained by redissolution of precipitated solids which has been recognized to occur in well-stabilized acids. See, Astley et al. U.S. Pat. No. 4,487,750 at col. 11, lines 28-34.

EXAMPLE 2

A second set of comparisons were performed to extend the results of example 1 to determine the critical temperature affecting post-precipitation. Samples of merchant acid were held in heated ovens at the stated temperature ±5° F. for one day and allowed to cool naturally to ambient temperature, i.e., about 70° F. Thereafter, the samples were analyzed as in Example 1 for total solids at 0, 14, and 28 days of starting to cool. Each sample container was shaken at 14 and 28 days and shaken before each sample was taken to obtain a homogeneous sample. The results are set forth in Table 2 and illustrated graphically in FIG. 3.

TABLE 2

| Aging T (°F.) | Aging T (°F.) | Standing Time (days) | Total Solids (wt %) |
|---|---|---|---|
| 165 | 1 | 0 | 0.71 |
| 165 | 1 | 14 | 1.61 |

TABLE 2-continued

| Aging T (°F.) | Aging T (°F.) | Standing Time (days) | Total Solids (wt %) |
|---|---|---|---|
| 165 | 1 | 28 | 2.11 |
| 175 | 1 | 0 | 0.68 |
| 175 | 1 | 14 | 1.68 |
| 175 | 1 | 28 | 2.36 |
| 180 | 1 | 0 | 0.65 |
| 180 | 1 | 14 | 0.48 |
| 180 | 1 | 28 | 0.53 |

From the examples, the stability of merchant acid against post-precipitation is substantially improved when aged at a temperature of about 180° F. The aged acid according to the present process exhibits less than 1 wt % solids precipitation after even 14 days of standing at about 70° F. Such stability corresponds directly to an improved product and increased suitability for most applications.

It is to be understood, however, that the examples presented herein and the accompanying drawings are for illustration and are not intended to limit the scope of the appended claims.

I claim:

1. A process for stabilizing solids-containing merchant acid solutions against post-precipitation, said process comprising:

separating an acid stream containing about 45 to about 60 wt % $P_2O_5$ into a solids-containing bottoms stream and a clarified acid stream;

separating said bottoms stream into a solids-enriched fraction and a merchant acid stream; and heating said merchant acid stream at atmospheric pressures for about 12 to about 48 hours at a temperature of 180°-200° F. to produce an aged merchant product that exhibits, without further solids separation, an amount of solids formed due to post-precipitation that is less than 1 wt % after 14 days of standing at a temperature of about 70° F.

2. The process of claim 1 wherein the heating step is for about 24 to about 48 hours.

3. The process of claim 2 wherein the heating step is for about 24 hours.

4. A process for making stabilized merchant acid, said process comprising:

a. dissolving a phosphate-containing ore in phosphoric acid, b. contacting the dissolved ore with sulfuric acid to precipitate calcium compounds and produce a first solution comprising less than 40 wt % phosphoric acid, c. concentrating said first solution under a vacuum at about 155°-160° F. to produce a second solution comprising about 40 wt % phosphoric acid, d. removing solids from said second solution, e. concentrating said second solution under vacuum at a temperature of about 175°-185° F. to produce an unclarified acid solution containing about 45-60 wt % $P_2O_5$, f. separating said unclarified acid solution into a clarified acid and a bottoms product, g. separating solids from said bottoms product to produce a merchant acid, h. heating said merchant acid at atmospheric pressures to a temperature between 180°-200° F. and maintaining said temperature for about 12 to about 48 hours to produce an aged merchant acid that exhibits, without further solids separation, a level of solids formed due to post-precipitation that is less than 1 wt % after standing for 14 days at a temperature of about 70° F.

* * * * *